US011938723B2

(12) United States Patent
Umeda et al.

(10) Patent No.: US 11,938,723 B2
(45) Date of Patent: Mar. 26, 2024

(54) PRINT ELEMENT SUBSTRATE, PRINT HEAD, AND PRINTING APPARATUS

(71) Applicant: CANON KABUSHIKI KAISHA, Tokyo (JP)

(72) Inventors: Kengo Umeda, Tokyo (JP); Yosuke Miura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 17/147,904

(22) Filed: Jan. 13, 2021

(65) Prior Publication Data

US 2021/0229431 A1 Jul. 29, 2021

(30) Foreign Application Priority Data

Jan. 27, 2020 (JP) ................................ 2020-011041

(51) Int. Cl.
*B41J 2/04* (2006.01)
*B41J 2/045* (2006.01)

(52) U.S. Cl.
CPC ....... *B41J 2/04543* (2013.01); *B41J 2/04541* (2013.01)

(58) Field of Classification Search
None
See application file for complete search history.

(56) References Cited

U.S. PATENT DOCUMENTS 5,969,730 A * 10/1999 Inose ..................... B41J 2/2128 347/17
6,382,755 B1 5/2002 Imanaka et al.
2003/0107611 A1 6/2003 Kim
2010/0053278 A1* 3/2010 Omata ................ B41J 2/04528 216/17

FOREIGN PATENT DOCUMENTS

JP 2000-94692 A 4/2000
JP 2003-291344 A 10/2003
JP 2005-246624 A 9/2005
JP 2014-162155 A 9/2014

* cited by examiner

*Primary Examiner* — Erica S Lin
(74) *Attorney, Agent, or Firm* — VENABLE LLP

(57) ABSTRACT

A print element substrate, comprising a plurality of functional elements, a plurality of driving elements configured to drive the plurality of functional elements based upon one of a plurality of drive signals, a shift register configured to store functional data indicating whether or not to drive the functional element, a data analyzing unit configured to analyze the functional data input into the shift register, and a drive signal selection unit configured to select one of the plurality of drive signals in response to an analysis result from the data analyzing unit.

13 Claims, 12 Drawing Sheets

PRINT ELEMENT SUBSTRATE, PRINT HEAD, AND PRINTING APPARATUS

BACKGROUND OF THE INVENTION

Field of the Invention

The present invention relates to a print element substrate, a print head and a printing apparatus, particularly to a print element substrate.

Description of the Related Art

Some printing apparatuses employ an inkjet printing method that uses thermal energy to discharge ink from a plurality of discharge ports. A print element substrate included in the printing apparatus is provided with, for example, a plurality of heat generation resistors and a plurality of driving elements corresponding to the plurality of heat generation resistors. A switch element such as a field effect transistor is used as the driving element, and the heat generation resistor is driven by switching. When the plurality of heat generation resistors are simultaneously driven, a relatively large current (e.g., a current of an amount equal to or larger than several amperes (A) during about 1 microsecond) may occur in a power source line. This may also lead to fluctuations in power supply voltage (voltage drops), degradation in printing accuracy associated with the fluctuations, or the like.

Japanese Patent Laid-Open No. 2003-291344 describes that, by using a first enable signal and a second enable signal that have different timings from each other, a plurality of print elements are driven by being divided into a first group of print elements to be driven by the first enable signal and a second group of print elements to be driven by the second enable signal. However, according to Japanese Patent Laid-Open No. 2003-291344, the content (signal values) of print data may cause the print elements to be driven to be biased toward one of the first group of print elements and the second group of print elements.

SUMMARY OF THE INVENTION

The present invention appropriately prevents fluctuations in power supply voltage and degradation in printing accuracy associated with the fluctuations.

One of the aspects of the present invention provides a print element substrate, comprising a plurality of functional elements, a plurality of driving elements configured to drive the plurality of functional elements based upon one of a plurality of drive signals, a shift register configured to store functional data indicating whether or not to drive the functional element, a data analyzing unit configured to analyze the functional data input into the shift register, and a drive signal selection unit configured to select one of the plurality of drive signals in response to an analysis result from the data analyzing unit.

Further features of the present invention will become apparent from the following description of exemplary embodiments (with reference to the attached drawings).

DESCRIPTION OF THE EMBODIMENTS

Figure 1A:
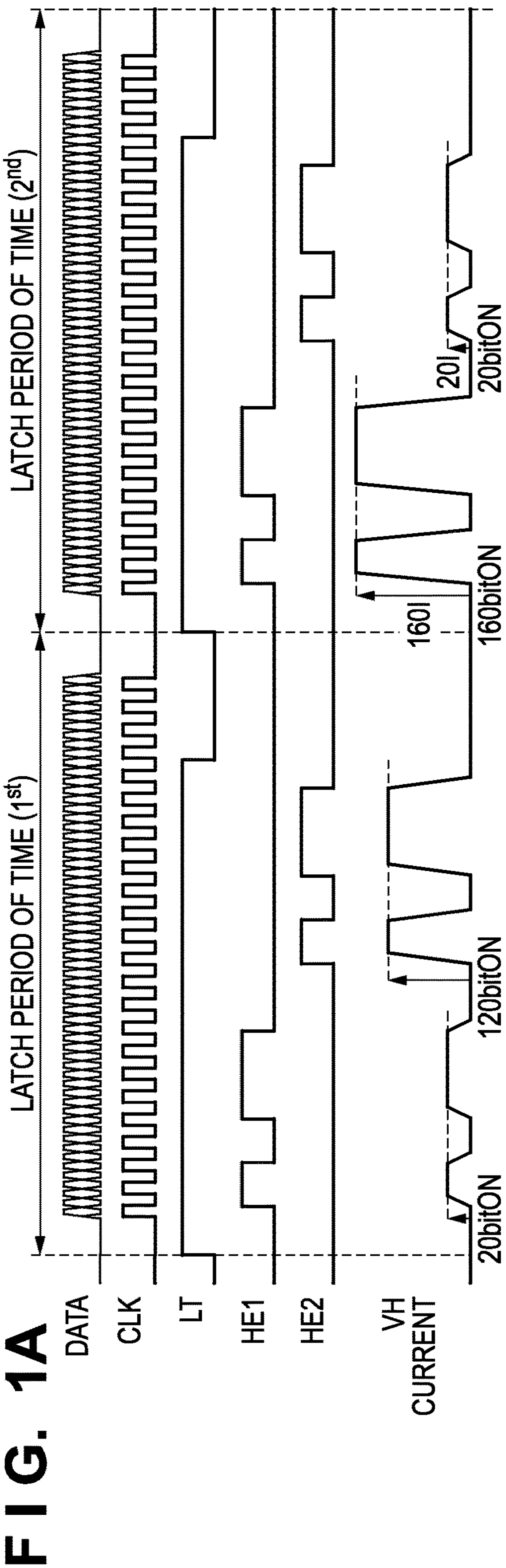
FIG. 1A is a timing chart illustrating an example of a method for driving or controlling a print element substrate.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Figure 3:
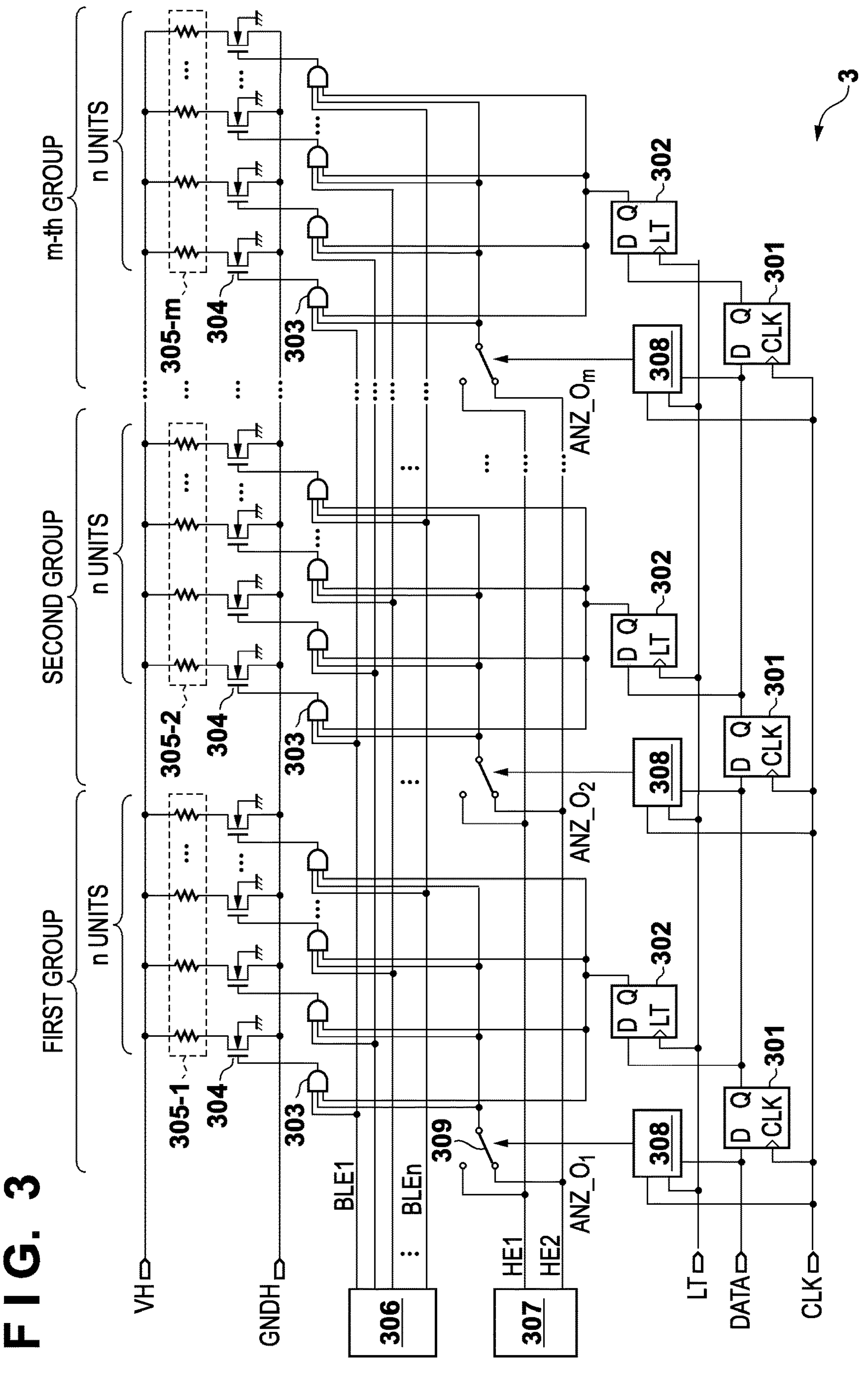
FIG. 3 is a diagram illustrating an example of a circuit configuration of the print element substrate.

FIG. 3 illustrates an example of a circuit configuration of a print element substrate 3 according to a first embodiment. The print element substrate 3 includes heat generation resistors 305 and a driving circuit for driving the heat generation resistors 305.

The heat generation resistor 305 functions as a print element for heating and discharging ink, and is provided corresponding to a nozzle of a print head provided in a printing apparatus (printer) using an inkjet printing method (the heat generation resistor 305 may be expressed as a print element 305 in some cases). The heat generation resistors 305 are divided into m (a plurality of) groups from a first group to an m-th group (m is an integer equal to or larger than 2). Each of the groups has n (a plurality of) heat generation resistors 305 (n is an integer equal to or larger than 2), and a driving method thereof employs a method in which one of them is sequentially selected, namely, a so-called time-division driving method. Note that driving the print elements by the time-division driving method may be expressed as time-division driving.

In the time-division driving method, the respective heat generation resistors 305 from first heat generation resistors 305 to n-th heat generation resistors 305 in the respective groups are also referred to as blocks and are driven substantially simultaneously in units of blocks. For example, as for from the first to m-th groups, the first heat generation resistors 305 are substantially simultaneously driven, then the second heat generation resistors 305 are substantially simultaneously driven, and, similarly, the third and subsequent heat generation resistors 305 are substantially simultaneously driven in order. Note that in the figure, n heat generation resistors 305 in the k-th group are collectively denoted as "305-*k*" (k is an integer from 1 to m).

Note that examples of an order of the driving of the above-described blocks include a control mode in which the plurality of heat generation resistors 305 in the group are driven in an arrangement order (expressed as sequential driving), a control mode in which the plurality of heat generation resistors 305 in the group are driven in an intermittent manner (discretely) (expressed as dispersed driving), and the like. In the present embodiment, any control mode can be utilized.

The driving circuit for driving the heat generation resistors 305 includes driving elements 304, shift registers 301, latch circuits 302, and control gates 303. The driving circuit further includes a block selection logic circuit 306, a heat enable (HE) generation circuit 307, print data analyzing units 308, and enable signal selection units 309.

The driving element 304 is a switch element that drives the heat generation resistor 305 by supplying power, and a field effect transistor is used as a typical example of the driving element 304.

The shift register 301 is configured to acquire the print data (DATA) at a rising edge of a clock signal (CLK) (at a timing when the clock signal is changed from a L level to a H level) to output the acquired print data to the shift register 301 on the next stage. The print data is a signal (or a signal group) that determines whether or not to drive the heat generation resistors 305 belonging to the corresponding group. Note that a logical level of the print data indicating that a certain heat generation resistor 305 is driven is denoted as "1", and a logical level of the print data indicating that the driving is suppressed is denoted as "0". In other words, the print data is logical data indicating whether or not to drive the heat generation resistors.

The latch circuit 302 holds the print data by a latch signal (LT). One shift register 301 and one latch circuit 302 are provided in each group.

The control gate 303 is a logical product circuit (AND circuit) in the present embodiment, and controls the driving element 304 based upon a logical product of the print data (DATA), a block selection signal (from BLE1 to BLEn) to be described below, and an enable signal (HE1 or HE2). The heat generation resistors 305 are allocated to a plurality of (n) blocks by connecting signal lines illustrated in FIG. 3.

The block selection logic circuit 306 generates block selection signals (from BLE1 to BLEn) to activate the control gates 303 in units of blocks.

The HE generation circuit 307 generates a first enable signal (HE1) and a second enable signal (HE2) for determining driving periods of time of the heat generation resistors 305 (electricity conduction periods of time between the heat generation resistors 305 and the driving elements 304). The details will be described below, but the first enable signal (HE1) and the second enable signal (HE2) are generated at different timings from each other.

The print data analyzing unit 308 analyzes the print data input to each shift register, and outputs a result of the analysis or a signal indicating the result (from $ANZ\_O_1$ to $ANZ\_O_m$ (which are indicated as ANZ_O in a case where they are not particularly distinguished)). The print data analyzing unit 308 may be represented as a data analyzing unit, or a signal analyzing unit, or may be simply represented as an analyzing unit.

The enable signal selection unit 309 selects one of the first enable signal (HE1) and the second enable signal (HE2) based upon the analysis result (ANZ_O) from the print data analyzing unit 308, and outputs the selected one to the control gates 303. As will be described in detail below, the enable signal selection unit 309 is configured to allow, based on the analysis result (ANZ_O) described above, the number of the print elements to be driven by the first enable signal (HE1) (i.e., the number of the heat generation resistors 305 to be driven) and the number of the print elements to be driven by the second enable signal (HE2) to be equal. In other words, the print data analyzing unit 308 controls, based upon the analysis result of the print data, the enable signal selection unit 309 so that the number of print elements to be driven by the first enable signal (HE1) and the number of print elements to be driven by the second enable signal (HE2) are equal to each other.

Note that the enable signal (HE1 or the like) is also referred to as one of a drive signal or a control signal for controlling the driving elements 304 (or a part of a block selection signal to be described below). Thus, from this aspect, the enable signal selection unit 309 may be referred to as a drive signal selection unit, or a control signal selection unit, or may be simply referred to as a selection unit or the like.

Figure 4:
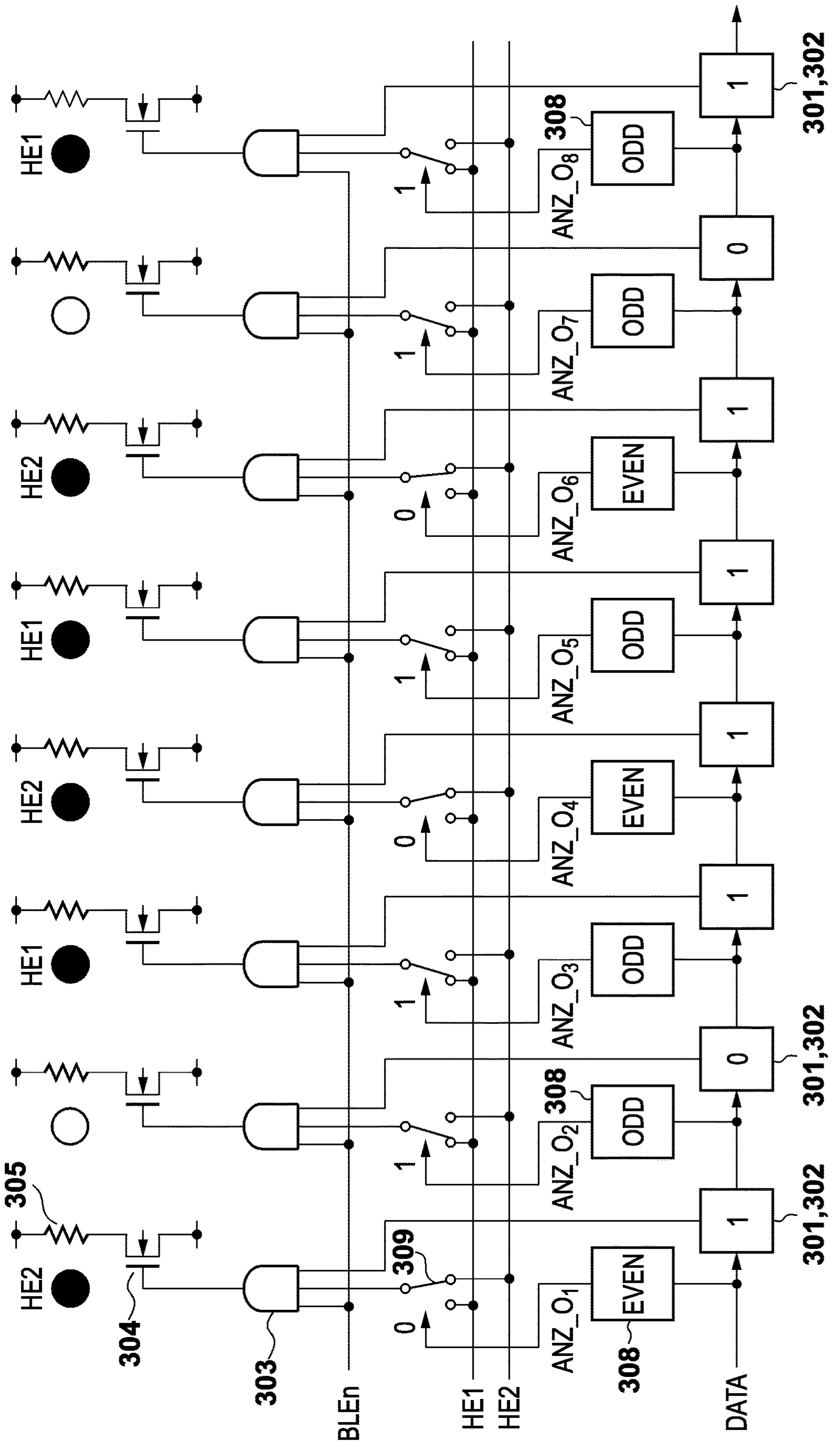
FIG. 4 is a simplified diagram illustrating the example of the circuit configuration of the print element substrate.

FIG. 4 illustrates a simplified circuit configuration of the print element substrate 3 in which m=8. A state is indicated in which one of the n heat generation resistors 305 in each of the first to eighth groups (here, the n-th heat generation resistors 305) is selected by the block selection signal (BLEn) generated in the block selection logic circuit 306. In FIG. 4, a circuit associated with the heat generation resistors 305 in the same block among the heat generation resistors 305 illustrated in FIG. 3 is extracted for ease of explanation. Accordingly, in FIG. 4, the heat generation resistors 305 assigned to the other blocks illustrated in FIG. 3 are not illustrated. The print data analyzing unit 308 counts the number of "1 s" of the print data input to the shift register 301.

For example, in a case where the print data "1" is input to the shift register 301 odd times, the print data analyzing unit 308 outputs "1" as the analysis result (ANZ_O), and in a case where the print data "1" is input to the shift register 301 even times, the print data analyzing unit 308 outputs "0" as the analysis result (ANZ_O). Specifically, in a case where $ANZ\_O_k$ is "1", the enable signal selection unit 309 selects the first enable signal (HE1), and in a case where $ANZ\_O_k$ is "0", the second enable signal (HE2) is selected.

According to the above-described driving or controlling method, two heat generation resistors 305 adjacent to each other among the heat generation resistors 305 to be driven in the same block are driven by mutually different enable signals (HE1 or HE2). Accordingly, the number of print elements to be driven by the first enable signal (HE1) and the number of print elements to be driven by the second enable signal (HE2) are substantially equal.

Figure 5B:
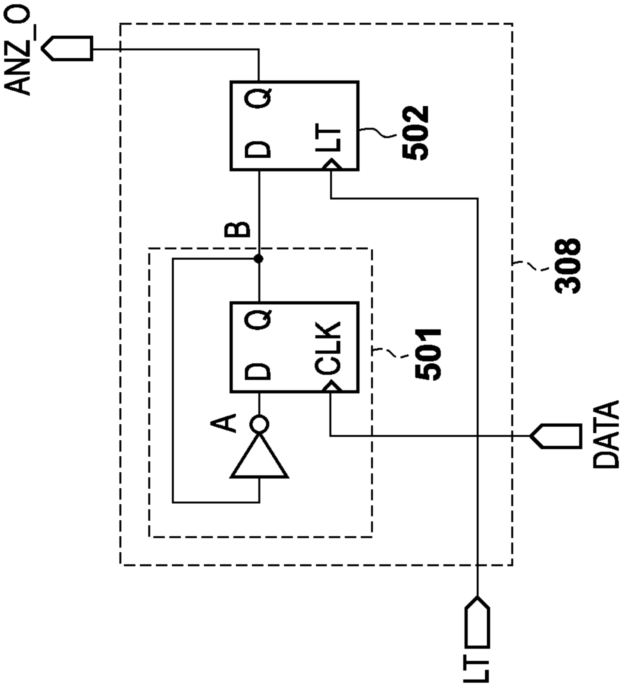
FIG. 5B is a diagram illustrating an example of a circuit configuration of the print data analyzing unit.
Figure 5A:
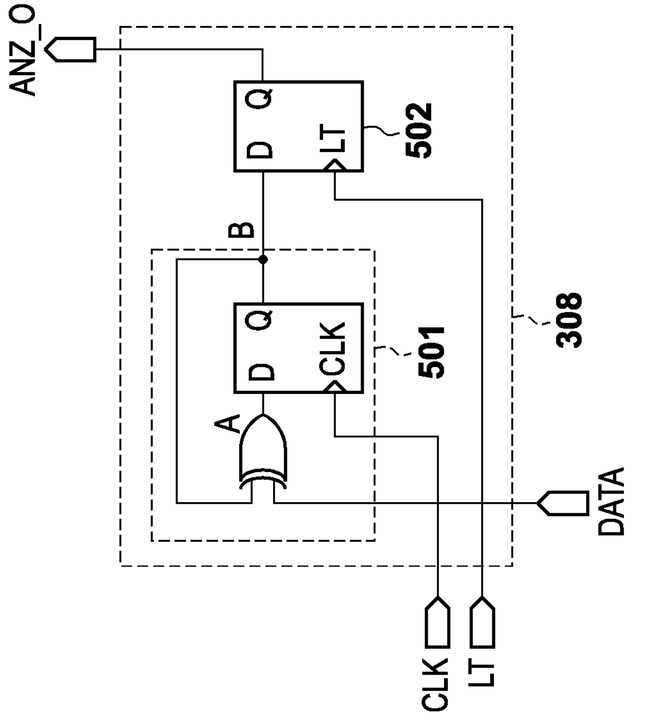
FIG. 5A is a diagram illustrating an example of a circuit configuration of a print data analyzing unit.

FIGS. 5A and 5B illustrate examples of circuit configurations of the print data analyzing unit 308. The print data analyzing unit 308 includes a counter (1-bit counter) 501 and a latch circuit 502 that holds the analysis result (ANZ_O) by the latch signal (LT). FIG. 5A illustrates a configuration example in a case of a synchronous counter, and FIG. 5B illustrates a configuration example in a case of an asynchronous counter.

Figure 1B:
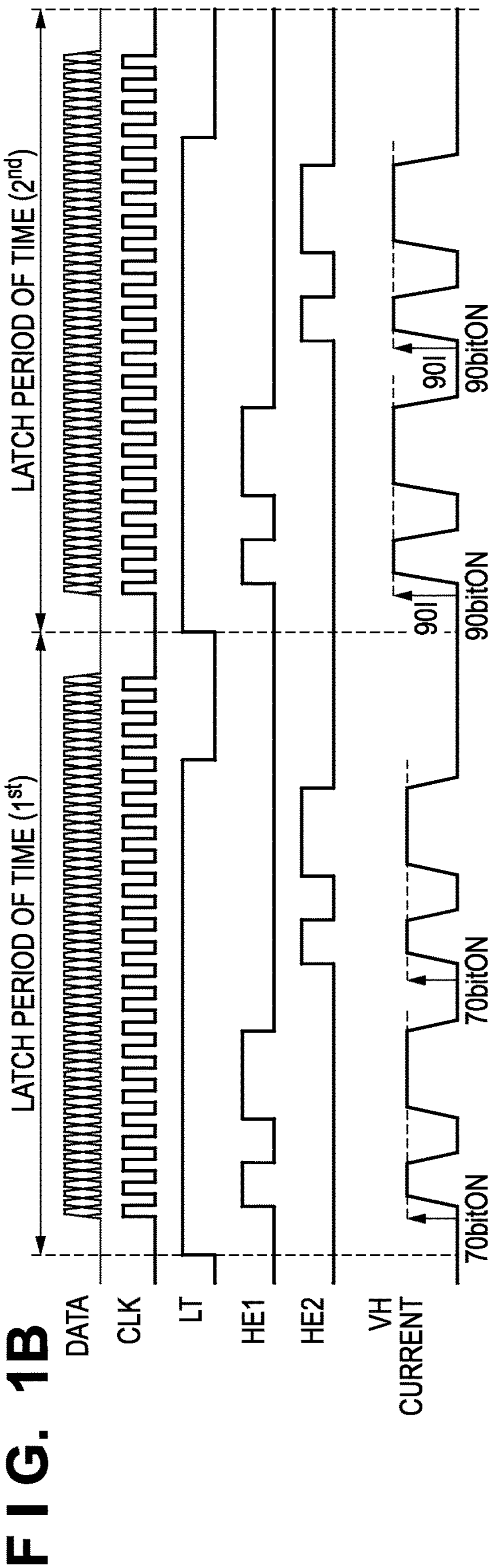
FIG. 1B is a timing chart illustrating an example of a method for driving or controlling a print element substrate.

FIG. 1B illustrates an example of a timing chart indicating a method for driving or controlling the print element substrate 3 according to the present embodiment, for a period corresponding to two latches by the latch circuit 502 (hereinafter, referred to as "two latch periods of time"). Note that a period of time corresponding to a single latch (hereinafter referred to as "one latch period of time") corresponds to a period of time required to drive one block. The print element substrate 3 prints one column or one row of an image on a printing medium such as paper by driving the heat generation resistors 305 by the time-division driving method. The first enable signal (HE1) and the second enable signal (HE2) are generated at different timings from each other in one latch period of time, so that they are not simultaneously at an active level.

In a first latch period of time (illustrated as "$1^{st}$" in FIGS. 1A and 1B to be described below), the shift register 301 receives the print data (DATA) sent from a printing apparatus main unit, and transfers the received print data to the shift register 301 on the next stage. At substantially the same time, the print data analyzing unit 308 counts "1" of the print data that is sequentially transferred to the corresponding shift register 301. In response to the end of the sending of the print data in the first latch period of time, the print data to be stored in each shift register 301 is determined. At substantially the same time, the analysis result (ANZ_O) of the print data analyzing unit 308 is also determined. Thereafter, in accordance with the stored print data and analysis result (ANZ_O), the corresponding heat generation resistor 305 is driven based on the first enable signal (HE1) or the second enable signal (HE2).

At a rising edge of the next latch signal (LT) (at a start timing of a second latch period of time (illustrated as "2 nd" in FIGS. 1A and 1B to be described below)), the print data (DATA) stored in each shift register 301 is newly stored in the latch circuit 302. At substantially the same time, the analysis result (ANZ_O) of the print data analyzing unit 308 is also stored in the latch circuit 502 in the print data analyzing unit 308. Thereafter, in accordance with the stored print data and analysis result (ANZ_O), the corresponding heat generation resistor 305 is driven based on the first enable signal (HE1) or the second enable signal (HE2).

According to such a driving or controlling method, two heat generation resistors 305 adjacent to each other among the heat generation resistors 305 to be driven in the same block are driven by mutually different enable signals from each other (HE1 or HE2). Accordingly, the number of print elements to be driven by the first enable signal (HE1) and the number of print elements to be driven by the second enable signal (HE2) are substantially equal.

According to the present embodiment, the number of print elements to be driven by the first enable signal (HE1) and the number of print elements to be driven by the second enable signal (HE2) are substantially equal by using the print data analyzing unit 308. Thus, a current value of a drive current (VH current) to be generated when the heat generation resistors 305 are driven is substantially equal between the first enable signal (HE1) and the second enable signal (HE2).

FIG. 1B illustrates an example of a timing chart for the print data by which 180 print elements in total are driven in the second latch period of time illustrated as "$2^{nd}$". In the present example, the number of print elements to be driven by the first enable signal (HE1) is 90, and the number of print elements to be driven by the second enable signal (HE2) is 90. In this case, the maximum value of the drive current (VH current) generated when the heat generation resistors 305 are driven is "90I" even at any timing of the first enable signal (HE1) and the second enable signal (HE2).

FIG. 1A illustrates an example of a timing chart in a case where the print data analyzing unit 308 is not provided as a reference example. In the present reference example, among 180 print elements to be driven in the second latch period of time, the number of print elements to be driven by the first enable signal (HE1) is 160, and the number of print elements to be driven by the second enable signal (HE2) is 20. That is, according to the present reference example, the number of print elements to be driven by the first enable signal (HE1) and the number of print elements to be driven by the second enable signal (HE1) may be biased. In such a case, the maximum value of the drive current (VH current) generated when the heat generation resistors 305 are driven is "1601" at the timing of the first enable signal (HE1). That is, according to the present embodiment, the maximum value of the drive current (VH current) is "90I" even at any timing of the first enable signal (HE1) and the second enable signal (HE2), and a relatively large current is not generated at a timing in one of them.

Figure 2A:
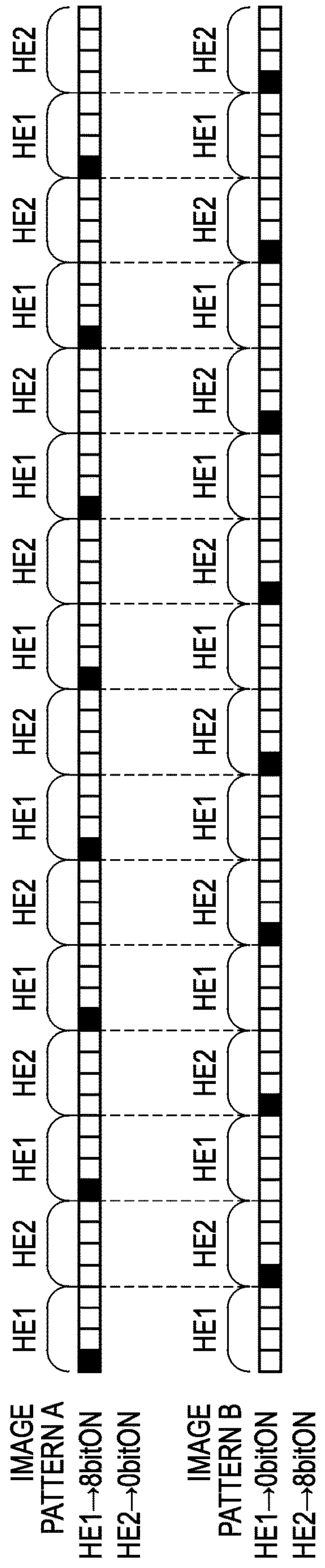
FIG. 2A is a diagram illustrating several examples of driving aspects of a print element substrate based on image patterns.

FIG. 2A illustrates, as a conventional example, an example of image patterns in a case where the print data analyzing unit 308 is not provided and the first enable signal (HE1) and the second enable signal (HE2) are alternately assigned to each one group. Note that for ease of understanding, m=16 and n=4 are set (a total number of print elements is 64). In the Figure, each of boxes illustrated by black squares indicates the heat generation resistor 305 to be driven.

In FIG. 2A, an image pattern A indicates an example of the print data by which only the heat generation resistors 305 belonging to the groups to be driven by the first enable signal (HE1) are driven. In the figure, the number of bits corresponds to the number of heat generation resistors 305. For example, the notation of 8 bit corresponds to eight heat generation resistors 305. In a case of such print data, the number of the heat generation resistors 305 to be driven by the first enable signal (HE1) is eight, and the number of the heat generation resistors 305 to be driven by the second enable signal (HE2) is zero. That is, a bias in number of the heat generation resistors 305 occurs toward the number of the heat generation resistors 305 to be driven by the first enable signal (HE1) of the first enable signal (HE1) and the second enable signal (HE2).

Moreover, an image pattern B indicates an example of print data by which only the heat generation resistors 305 belonging to the groups to be driven by the second enable signal (HE2) are driven. In a case of such print data, the number of the heat generation resistors 305 to be driven by the first enable signal (HE1) is zero, and the number of the print elements to be driven by the second enable signal (HE2) is eight. That is, a bias in number of the heat generation resistors 305 occurs toward the number of the heat generation resistors 305 to be driven by the second enable signal (HE2) of the first enable signal (HE1) and the second enable signal (HE2).

When the printing apparatus is actually used, the print data for printing such image patterns A and B may occur. However, a design in consideration of such image patterns A and B (designing a power supply circuit and a printed-circuit board so as to increase an upper limit value of a permissible current) may also lead to a higher cost of the printing apparatus, electronic components configuring the same, and the like.

Figure 2B:
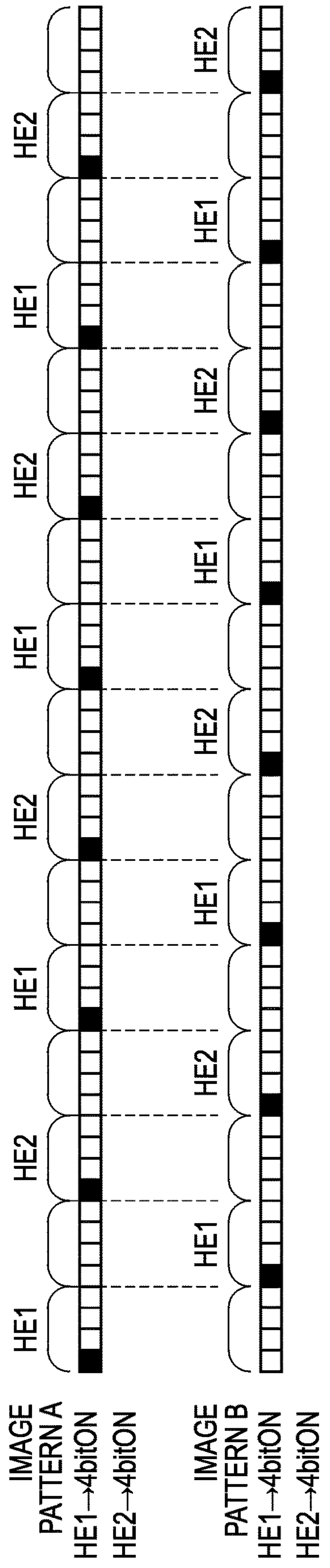
FIG. 2B is a diagram illustrating several examples of driving aspects of the print element substrate based on image patterns.

In contrast, FIG. 2B illustrates an example of the image patterns A and B in a case of the print element substrate 3 according to the present embodiment, similarly to FIG. 2A. As described above, according to the print element substrate 3, by using the print data analyzing unit 308, two heat generation resistors 305 adjacent to each other among the heat generation resistors 305 to be driven in the same block are driven by mutually different enable signals from each other (HE1 or HE2). Therefore, for each of both the image pattern A and the image pattern B, the number of print elements to be driven is at most four. That is, according to the present embodiment, even in a case where the print data for printing any image pattern is generated, the number of print elements to be driven by the first enable signal (HE1) and the number of print elements to be driven by the second enable signal (HE2) are evenly assigned. As a result, it is possible to appropriately prevent/suppress a situation in which an amount of drive current is locally biased, and incidentally, the design cost of the print element substrate 3 can be reduced.

According to the present embodiment, the heat generation resistors 305 as print elements are driven by the time-division driving method. At this time, within one latch period of time, the shift register 301 corresponding to each of the groups transfers the print data (DATA) to the shift register 301 on the next stage based on the clock signal (CLK). Meanwhile, the print data analyzing unit 308 corresponding to each shift register 301 analyzes the print data (DATA), and outputs a signal based on the number of transfers (odd or even number of times, here) of the print data “1” as the analysis result (ANZ_O). Here, the print data “1” corresponds to a logical level indicating that the heat generation resistor 305 is driven. This analysis result (ANZ_O) determines which one of the first enable signal (HE1) and the second enable signal (HE2) in the one latch period of time is used to drive the heat generation resistor 305 to be driven.

According to such a driving or controlling method, two heat generation resistors 305 adjacent to each other among the heat generation resistors 305 to be driven in the same block are driven by mutually different enable signals from each other (HE1 or HE2). As a result, the number of print elements to be driven by the first enable signal (HE1) and the number of print elements to be driven by the second enable signal (HE2) are substantially equal. Thus, according to the present embodiment, it is possible to appropriately prevent/suppress a situation in which the amount of drive current is locally biased, and as a result, it is possible to appropriately prevent fluctuations in power supply voltage and degradation in printing accuracy associated with the fluctuations. Additionally, according to the present embodiment, it is also possible to incidentally reduce the design cost of the print element substrate 3.

Second Embodiment

In the first embodiment described above, an aspect is exemplified in which the first enable signal (HE1) and the second enable signal (HE2) are used within the one latch period of time, but the same applies to a case where the number of enable signals is equal to or larger than three.

Figure 6:
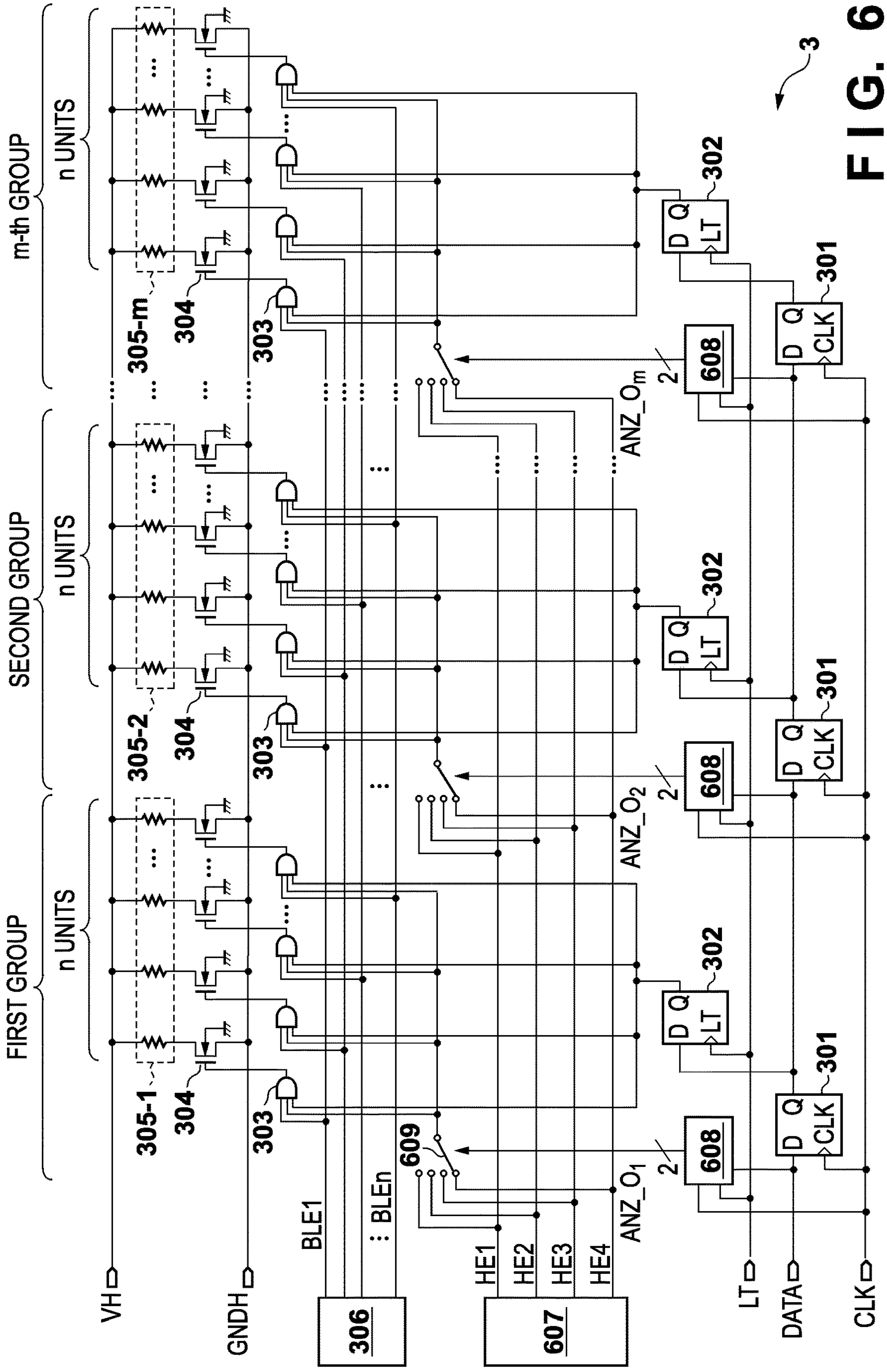
FIG. 6 is a diagram illustrating an example of a circuit configuration of the print element substrate.

FIG. 6 illustrates an example of a circuit configuration of the print element substrate 3 according to a second embodiment. The present embodiment differs from the first embodiment mainly in a configuration of an HE generation circuit 607, print data analyzing units 608, and enable signal selection units 609.

The HE generation circuit 607 generates a third enable signal (HE3) and a fourth enable signal (HE4) in addition to the first enable signal (HE1) and the second enable signal (HE2). The first to fourth enable signals (HE1 to HE4) are generated at different timings from one another in one latch period of time, so that they are not simultaneously at an active level.

The print data analyzing unit 608 analyzes the print data (DATA) input to the shift register 301, and outputs the analysis result (ANZ_O) having 2 bits. The enable signal selection unit 609 selects one of the first to fourth enable signals (HE1 to HE4) in accordance with the analysis result (ANZ_O) having 2 bits output by the print data analyzing unit 608, and outputs the selected one to the control gates 303.

According to the present embodiment, the print data analyzing unit 608 analyzes the print data (DATA), and controls the enable signal selection unit 609 so that the numbers of print elements to be driven by the first to fourth enable signals (HE1 to HE4) are equal to each other. Thus, according to the present embodiment, an amount of drive current generated by each enable signal (each of HE1 to HE4) is reduced further in half as compared to the first embodiment.

Figure 7:
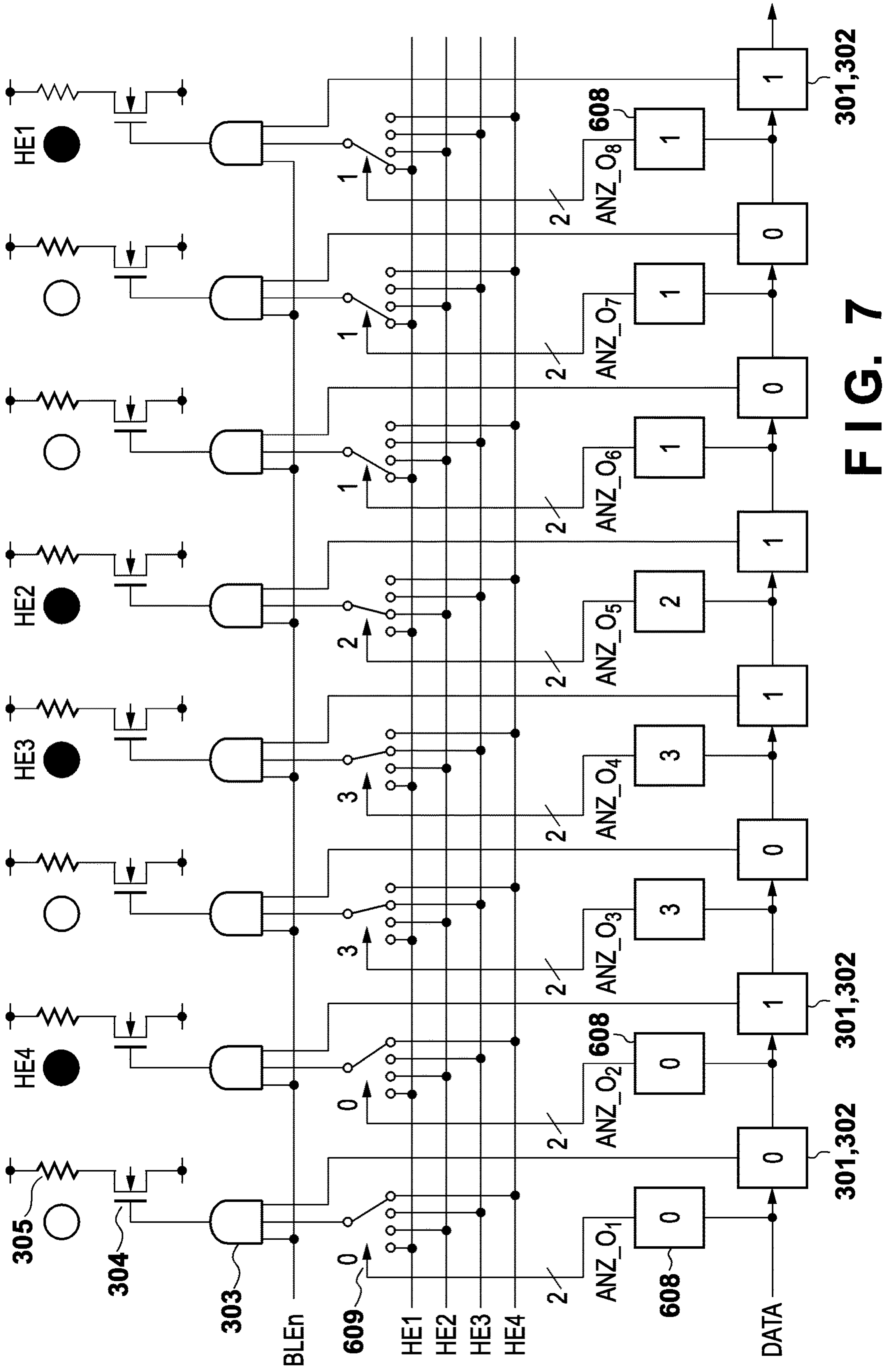
FIG. 7 is a simplified diagram illustrating the example of the circuit configuration of the print element substrate.

FIG. 7 is a simplified circuit configuration of the print element substrate 3 according to the present embodiment, and illustrates a driving aspect of the heat generation resistors 305 included in the same block, similarly to FIG. 4. The print data analyzing unit 608 is a multi-bit (2-bit) counter for counting the number of “1 s” of the print data input to the shift registers 301.

For example, the print data analyzing unit 308 outputs “1 (01 in binary)” to the analysis result (ANZ_O) in a case where a remainder is 1 when the number of times of “1 s” of the print data input into the shift registers is divided by four. Similarly, the print data analyzing unit 308 outputs “2 (10 in binary)” when the remainder is 2, outputs “3 (11 in binary)” when the remainder is 3, and outputs “0 (00 in binary)” when the remainder is 0, to the analysis result (ANZ_O).

The enable signal selection unit 609 selects HE1 in a case where ANZ_O is “1”, selects HE2 in a case where ANZ_O is “2”, selects HE3 in a case where ANZ_O is “3”, and selects HE4 in a case where ANZ_O is “0”. According to such an operation, two heat generation resistors 305 adjacent to each other among the heat generation resistors 305 to be driven in the same block are driven by mutually different enable signals (HE1, HE2, HE3, or HE4). That is, the numbers of print elements to be driven by the first to fourth enable signals (HE1 to HE4) are equal to each other.

Figure 8:
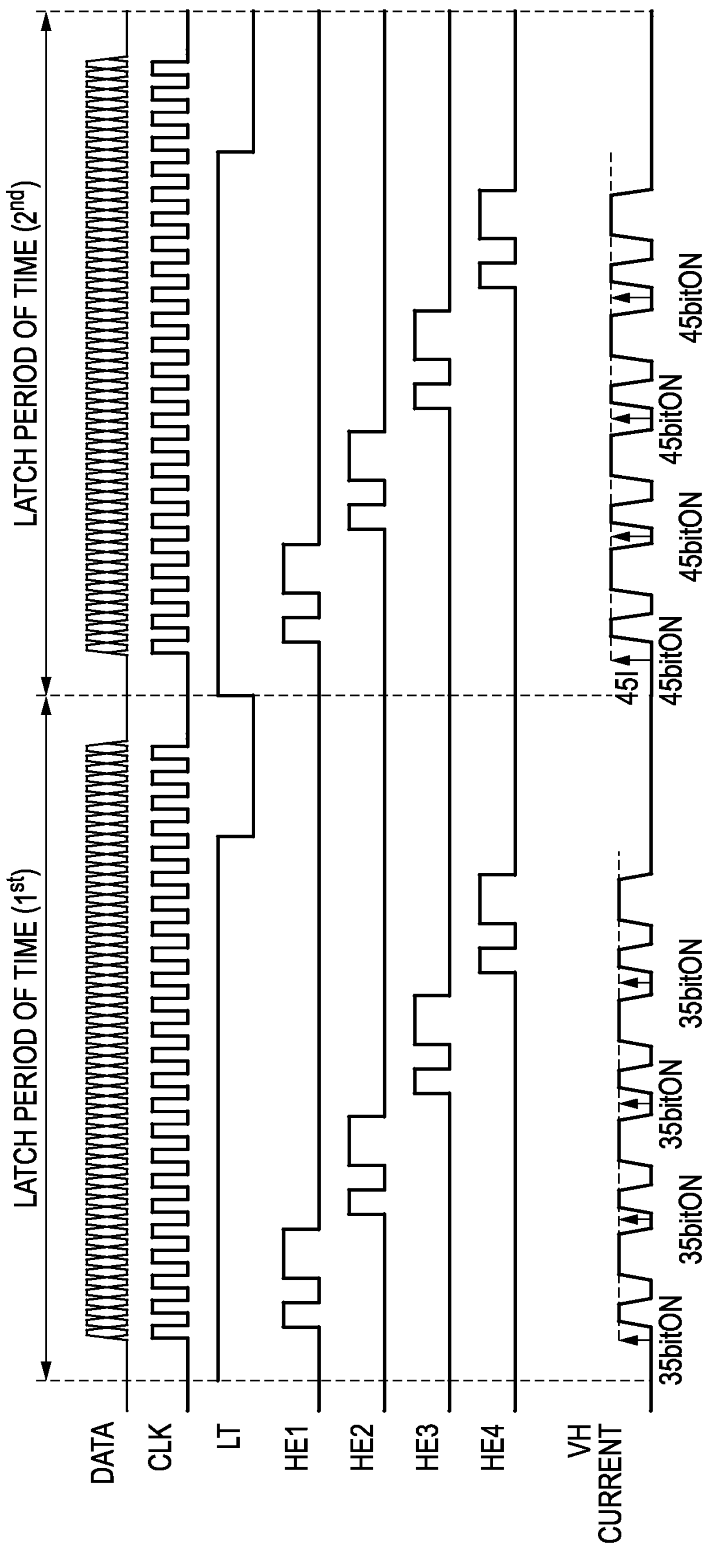
FIG. 8 is a timing chart illustrating an example of a method for driving or controlling the print element substrate.

FIG. 8 is a timing chart (for two latch periods of time) illustrating a method for driving or controlling the print element substrate 3 according to the present embodiment, similarly to FIG. 1B of the first embodiment. As described above, the first to fourth enable signals (HE1 to HE4) are generated at different timings from each other in one latch period of time, so that they are not simultaneously at an active level.

In the first latch period of time, the shift register 301 receives the print data (DATA) sent from the printing apparatus main unit, and transfers the received print data to the shift register 301 on the next stage. At substantially the same time, the print data analyzing unit 608 counts “1” of the print data that is sequentially transferred to the corresponding shift register 301. In response to the end of the sending of the print data in the first latch period of time, the print data to be stored in each shift register 301 is determined. At substantially the same time, the analysis result (ANZ_O) of the print data analyzing unit 608 is also determined.

At a rising edge of the next latch signal (LT) (at a start timing of the second latch period of time), the print data (DATA) stored in each shift register 301 is newly stored in the latch circuit 302. At substantially the same time, the analysis result (ANZ_O) of the print data analyzing unit 608 is also stored in the latch circuit in the print data analyzing unit 608. Thereafter, in accordance with the stored print data and analysis result (ANZ_O), the corresponding heat generation resistor 305 is driven based on one of the first to fourth enable signals (HE1 to HE4).

According to such a driving or controlling method, two heat generation resistors adjacent to each other among the heat generation resistors 305 to be driven in the same block are driven by mutually different enable signals (HE1, HE2, HE3, or HE4) from each other. As a result, the numbers of print elements to be driven by the first to fourth enable signals (HE1 to HE4) are substantially equal to each other.

According to the present embodiment, the numbers of print elements to be driven by the print data analyzing unit 608 by using the first to fourth enable signals (HE1 to HE4) are substantially equal to each other. Therefore, a current value of the drive current (VH current) generated when the heat generation resistors 305 are driven is substantially equal among the first to fourth enable signals (HE1 to HE4). Note that in a case where the number of enable signals is equal to or larger than 5, the number of bits of a counter in the print data analyzing unit 608 may be increased. For example, when the number of enable signals is eight, a 3-bit counter may be used, and when the number of enable signals is 16, a 4-bit counter may be used.

Note that the example of FIG. 8 illustrates, similarly to the example of FIG. 1B of the first embodiment, the example of the timing chart for the print data by which 180 print elements in total are driven in the second latch period of time. In the present example, the number of print elements to be driven by each of the first to fourth enable signals (HE1 to HE4) is 45, and the maximum value of the drive current (VH current) is "45I" at any timing of the first to fourth enable signals (HE1 to HE4). Since the maximum value of the drive current in the first embodiment is "90I", according to the present embodiment, it is understood that the maximum value of the drive current is reduced by half, as compared to the first embodiment, and thus the fluctuations in power supply voltage and the degradation in print accuracy associated with the fluctuations can be further appropriately prevented.

Third Embodiment

The first and second embodiments have described that the drive current generated when the heat generation resistors 305 are driven as the print elements is reduced, and the contents of the first and second embodiments are also applicable to reduction of current consumption of other applications.

Figure 9:
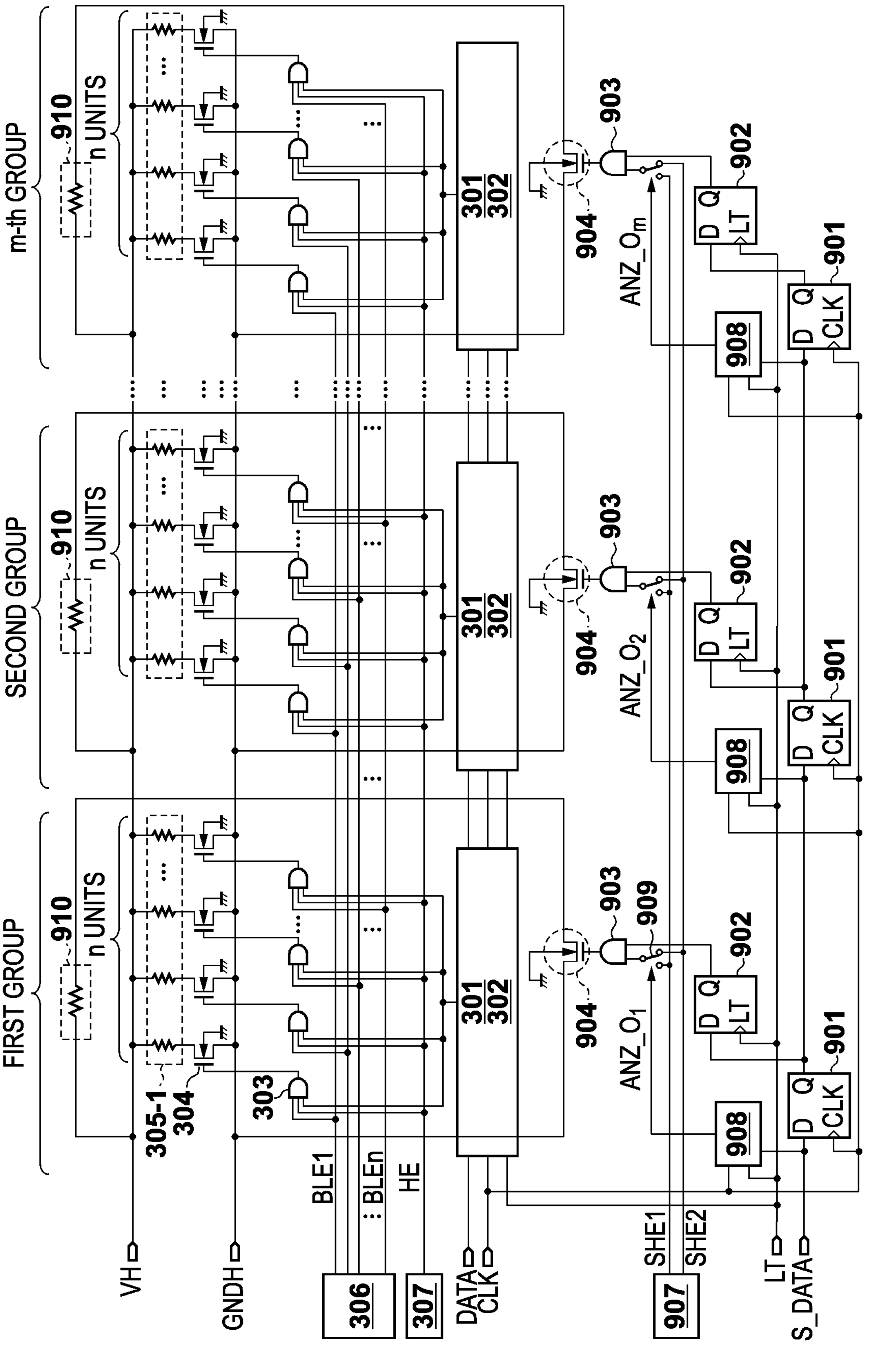
FIG. 9 is a diagram illustrating an example of a circuit configuration of the print element substrate.

FIG. 9 illustrates an example of a circuit configuration of the print element substrate 3 according to a third embodiment. In the present embodiment, a sub-heater 910 for controlling the temperature of the print element substrate 3 is provided, and the present embodiment differs from the first and second embodiments on this point.

A plurality of the sub-heaters 910 are provided in the print element substrate 3 so as to be able to heat a specific region of the print element substrate 3, and allows the temperature in the print element substrate 3 to be uniform by desirably heating the specific region. In the present embodiment, as an example, a single sub-heater 910 is provided in each group.

In the present embodiment, the print element substrate 3 may be provided with, in addition to the plurality of sub-heaters 910 described above, a circuit for driving or controlling the plurality of sub-heaters 910 (this circuit may be referred to as a temperature control circuit or the like). In the present embodiment, the circuit includes a plurality of driving elements 904, a plurality of shift registers 901, a plurality of latch circuits 902, a plurality of control gates 903, a plurality of sub-heat data analyzing units 908, and a plurality of sub-heat enable signal selection units 909. One driving element 904, one shift register 901, one latch circuit 902, one control gate 903, one sub-heat data analyzing unit 908, and one sub-heat enable signal selection unit 909 are provided in each group so as to correspond to a single sub-heater 910.

A field effect transistor is typically used for the driving element 904. The shift register 901 acquires sub-heat data (SH_DATA) at a rising edge of the clock signal (CLK) and outputs the acquired sub-heat data to the shift register 901 on the next stage. The sub-heat data is a signal (or a signal group) that determines whether or not to drive the sub-heater 910 belonging to the corresponding group. Note that a logical level of the sub-heat data indicating that a certain sub-heater 910 is driven is denoted as "1", and a logical level of the sub-heat data indicating that the driving is suppressed is denoted as "0".

The latch circuit 902 holds the sub-heat data (SH_DATA) by the latch signal (LT).

Here, the print element substrate 3 further includes a sub-heat enable (SHE) generation circuit 907. The SHE generation circuit 907 generates a first sub-heat enable signal (SHE1) and a second sub-heat enable signal (SHE2) for determining driving periods of time of the sub-heaters 910 (electricity conduction periods of time between the sub-heaters 910 and the driving elements 904). Similarly to the first and second enable signals (HE1, HE2) described above, the first sub-heat enable signal (SHE1) and the second sub-heat enable signal (SHE2) are generated at different timings from each other.

The control gate 903 is a logical product circuit (AND circuit) in the present embodiment, and controls the driving element 904 based upon a logical product of the sub-heat data (SH_DATA) and the sub-heat enable signal (SHE1 or SHE2).

The sub-heat data analyzing unit 908 analyzes the sub-heat data input to each shift register, and outputs the analysis result or a signal (ANZ_O) indicating the result. The sub-heat data analyzing unit 908, similarly to the print data analyzing unit 308, may be represented as a data analyzing unit, or a signal analyzing unit, or may be simply represented as an analyzing unit.

The sub-heat enable signal selection unit 909 selects either one of the first sub-heat enable signal (SHE1) and the second sub-heat enable signal (SHE2) based upon the analysis result (ANZ_O) output from the sub-heat data analyzing unit 908. The selected one (SHE1 or SHE2) is then output to the control gate 903. The sub-heat enable signal selection unit 909, similarly to the enable signal selection unit 309, allows the number of sub-heaters to be driven by the first sub-heat enable signal (SHE1) (i.e., the driving number of the sub-heaters 910) and the number of sub-heaters to be driven by the second sub-heat enable signal (SHE2) to be equal based upon the analysis result (ANZ_O) described above. In other words, the sub-heat data analyzing unit 908 controls the sub-heat enable signal selection unit 909 based upon the analysis result of the sub-heat data so that the numbers of print elements to be driven by the first and second sub-heat enable signals (SHE1 and SHE2) are equal to each other.

Thus, the present embodiment has a relationship with the first to second embodiments in which the sub-heat data analyzing unit 908 achieves a similar function to that of the print data analyzing unit 308, and the sub-heat enable signal selection unit 909 achieves a similar function to that of the enable signal selection unit 309.

Figure 10:
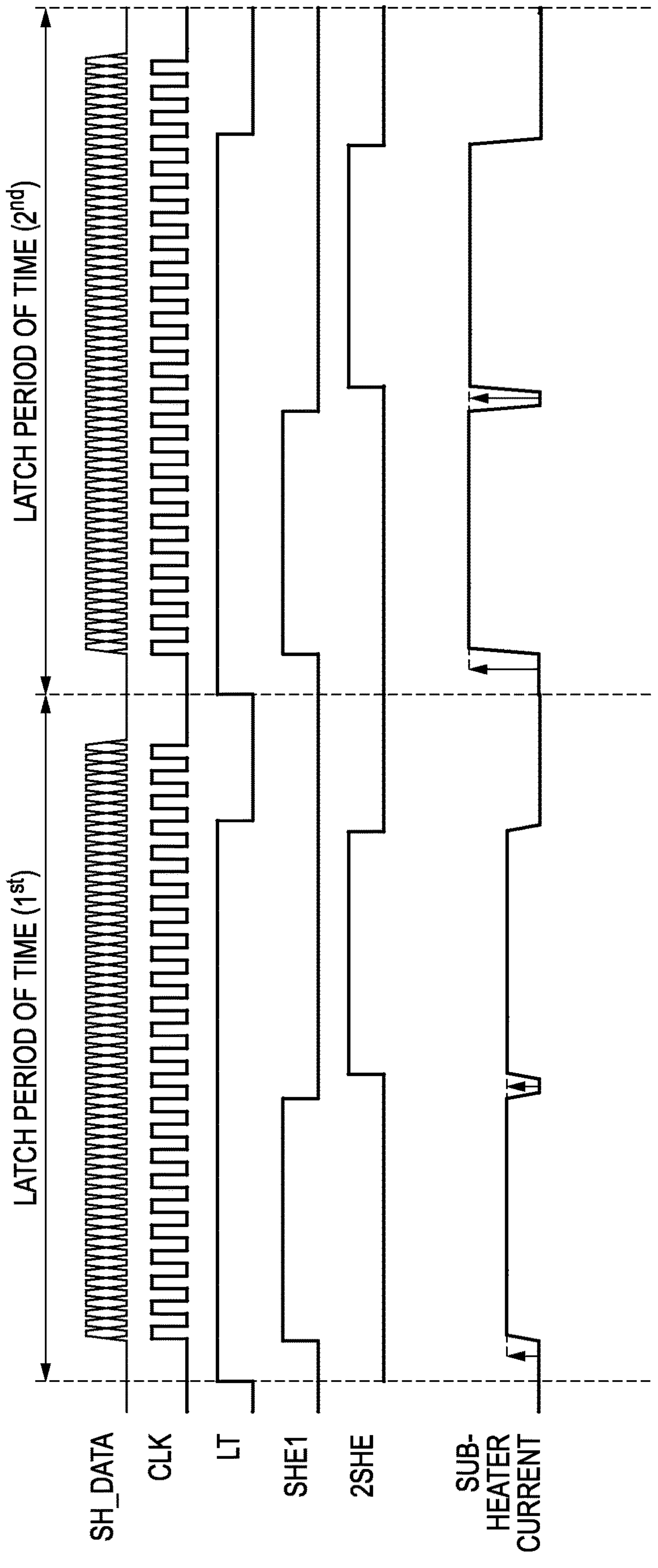
FIG. 10 is a timing chart illustrating an example of a method for driving or controlling the print element substrate.

FIG. 10 illustrates a timing chart (for two latch periods of time) indicating a method for driving or controlling the print element substrate 3 according to the present embodiment, similarly to FIG. 1B of the first embodiment and FIG. 8 of the second embodiment. As described above, the first sub-heat enable signal (SHE1) and the second sub-heat enable signal (SHE2) are generated at different timings from each other in one latch period of time, so that they are not simultaneously at the active level.

In the first latch period of time, the shift register 901 receives the sub-heat data (SH_DATA) sent from a controller IC (not illustrated) of the printing apparatus, and transfers the received sub-heat data to the shift register 901 on the next stage. At substantially the same time, the sub-heat data analyzing unit 908 counts "1" of the sub-heat data that is sequentially transferred to the corresponding shift register 901. In response to the end of the sending of the sub-heat data within the first latch period of time, the sub-heat data to be stored in each shift register 901 is determined. At substantially the same time, the analysis result (ANZ_O) of the sub-heat data analyzing unit 908 is also determined.

At a rising edge of the next latch signal (LT) (at a start timing of the second latch period of time), the sub-heat data (SH_DATA) stored in each shift register 901 is newly stored in the latch circuit 902. At substantially the same time, the analysis result (ANZ_O) of the sub-heat data analyzing unit 908 is also stored in the latch circuit in the sub-heat data analyzing unit 908. Thereafter, in accordance with the stored sub-heat data and analysis result (ANZ_O), the corresponding sub-heater 910 is driven based on the first sub-heat enable signal (SHE1) or the second sub-heat enable signal (SHE2).

According to such a driving or controlling method, two sub-heaters 910 adjacent to each other among the sub-heaters 910 to be driven are driven by different sub-heat enable signals from each other (SHE1 or SHE2). Accordingly, the number of print elements to be driven by the first sub-heat enable signal (SHE1) and the number of print elements to be driven by the second sub-heat enable signal (SHE2) are substantially equal.

According to the present embodiment, by the sub-heat data analyzing unit 908, the number of sub-heaters to be driven by the first sub-heat enable signal (SHE1) is substantially equal to the number of sub-heaters to be driven by the second sub-heat enable signal (SHE2). Thus, the current value of the sub-heat drive current generated when the sub-heaters 910 are driven is substantially equal between the first sub-heat enable signal (SHE1) and the second sub-heat enable signal (SHE2).

As described above, according to the present embodiment, the drive current of the sub-heaters 910 can be reduced incidentally to/alternatively to the drive current generated when the heat generation resistors 305 are driven as the print elements. Thus, according to the present embodiment, it is possible to appropriately prevent the fluctuations in power supply voltage and the degradation in printing accuracy associated with the fluctuations.

Fourth Embodiment

Figure 11:
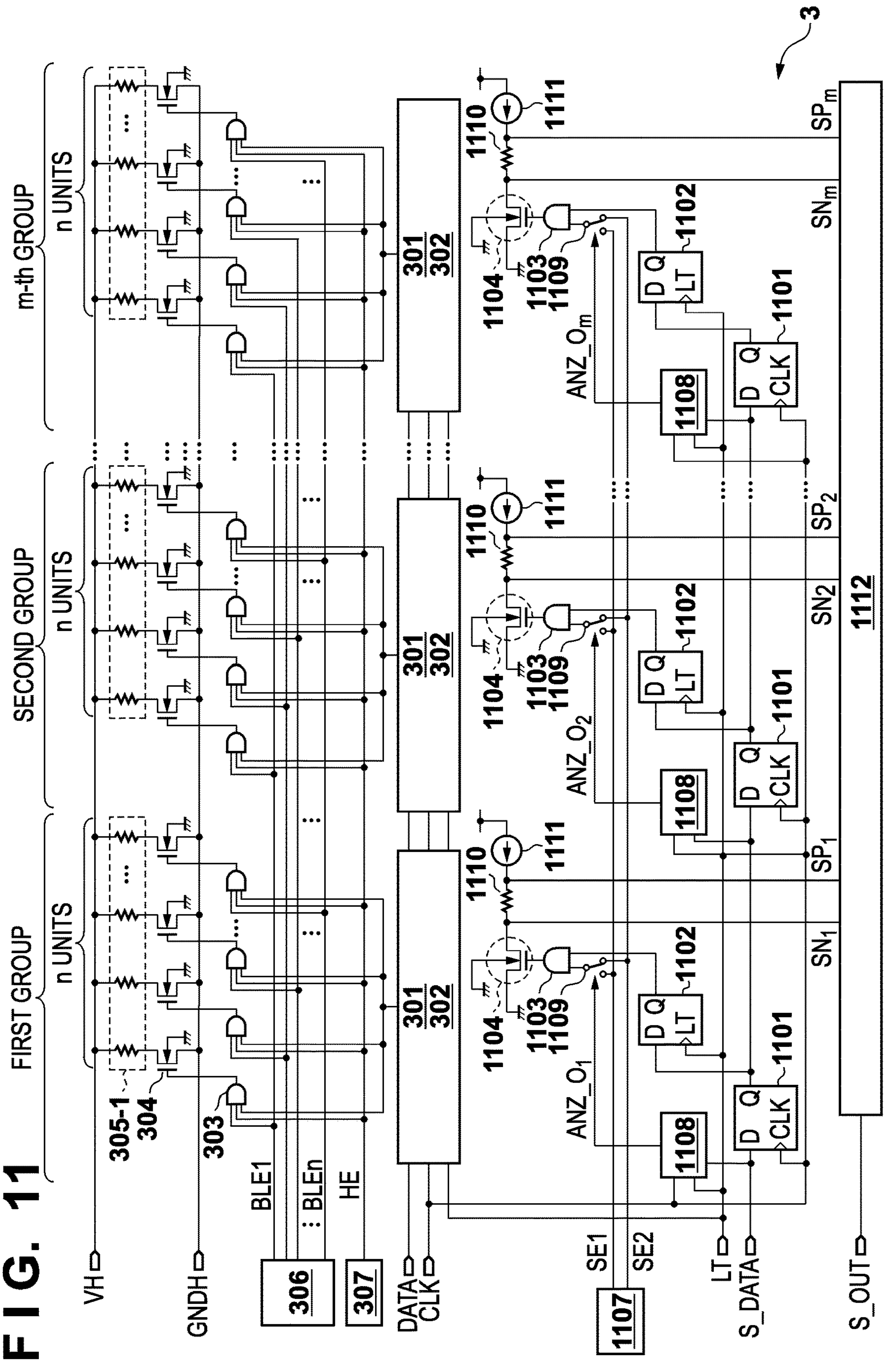
FIG. 11 is a diagram illustrating an example of a circuit configuration of the print element substrate.

FIG. 11 illustrates an example of a circuit configuration of the print element substrate 3 according to a fourth embodiment of the present invention. In the present embodiment, a temperature sensor 1110 for measuring the temperature of the print element substrate 3 is provided, and the present embodiment differs from the first to third embodiments described above on this point.

The temperature sensor 1110 detects the temperature of a specific region of the print element substrate 3. A plurality of the temperature sensors 1110 are provided in the print element substrate 3, and detect the temperature of the specific region. As a result, a pulse width of an enable pulse (HE) for driving or controlling the print element (heat generation resistor 305) disposed in the corresponding region can be changed based on the detected temperature. Alternatively, in a case where an unintended temperature increase of the print element substrate 3 occurs, the power supply can be stopped. In the present embodiment, as an example, a single temperature sensor 1110 is provided in each group. The temperature sensor 1110 may be represented as a temperature detecting sensor or may be simply represented as a sensor or the like.

Note that, as a result of the detection by the temperature sensor 1110, a potential difference between both ends SNk and SPk can be output to a calculation unit 1112 (k is an integer from 1 to m).

In the present embodiment, the print element substrate 3 is provided with, in addition to the plurality of temperature sensors 1110 described above, a circuit for driving or controlling the plurality of temperature sensors 1110 (this circuit may be referred to as a temperature detecting circuit, a sensor driving circuit, a sensor control circuit, and the like). The circuit includes a plurality of driving elements 1104, a plurality of shift registers 1101, a plurality of latch circuits 1102, a plurality of control gates 1103, a plurality of sensor selection data analyzing units 1108, and a plurality of sensor enable signal selection units 1109. One driving element 1104, one shift register 1101, one latch circuit 1102, one control gate 1103, one sensor selection data analyzing unit 1108, and one sensor enable signal selection unit 1109 are provided in each group so as to correspond to a single temperature sensor 1110.

The print element substrate 3 further includes constant current sources 1111 provided so as to correspond to the temperature sensors 1110. The driving element 1104 controls whether or not the current of the constant current source 1111 is made to flow through the temperature sensor 1110, and a field effect transistor is used as a typical example of the driving element 1104. The shift register 1101 acquires sensor selection data (S_DATA) at a rising edge of the clock signal (CLK) and outputs the acquired sensor selection data to the shift register 1101 on the next stage. The sensor selection data is a signal (or a signal group) that determines whether or not a current of the constant current source 1111 is supplied to the temperature sensor 1110 belonging to the corresponding group. Note that a logical level of the sensor selection data indicating that a current is supplied to a certain temperature sensor 1110 is denoted as "1", and a logical level of the sensor selection data indicating that the supply is suppressed is denoted as "0". In other words, the sensor selection data is logical data indicating whether or not to supply power to (drive) the temperature sensor.

The latch circuit 1102 holds the sensor selection data (S_DATA) by the latch signal (LT).

Here, the print element substrate 3 further includes a sensor enable (SE) generation circuit 1107. The SE generation circuit 1107 generates a first sensor enable signal (SE1) and a second sensor enable signal (SE2) for determining periods of time for supplying the current to the temperature sensors 1110 (electricity conduction periods of time between the temperature sensors 1110 and the driving elements 1104). Similarly to the first enable signal (HE1) and the second enable signal (HE2) described above, the first sensor enable signal (SE1) and the second sensor enable signal (SE2) are generated at different timings from each other.

The control gate 1103 is a logical product circuit (AND circuit) in the present embodiment, and controls the driving element 1104 based upon a logical product of the sensor selection data and the sensor enable signal (SE1 or SE2).

The sensor selection data analyzing unit 1108 analyzes the sensor selection data input to each shift register, and outputs the analysis result (ANZ_O). The sensor selection data analyzing unit 1108 may be represented as a data analyzing unit, or a signal analyzing unit, or may be simply represented as an analyzing unit, similarly to the print data analyzing unit 308.

The sensor enable signal selection unit 1109 selects either one of the first sensor enable signal (SE1) and the second sensor enable signal (SE2) based upon the analysis result (ANZ_O) output from the sensor selection data analyzing unit 1108. The selected one (SE1 or SE2) is then output to the control gate 1103. The sensor enable signal selection unit 1109, similarly to the enable signal selection unit 309, allows the number of temperature sensors to be driven by the first sensor enable signal (SE1) (i.e., the number of temperature sensors 1110 to which a current is supplied) and the number of temperature sensors to be driven by the second sensor enable signal (SE2) to be equal based upon the analysis result (ANZ_O) described above. In other words, the sensor selection data analyzing unit 1108 controls the sensor enable signal selection unit 1109 based upon the analysis result of the sensor selection data so that the numbers of temperature sensors to be driven by the first and second sensor enable signals (SE1 and SE2) are equal to each other.

As previously described, the first sensor enable signal (SE1) and the second sensor enable signal (SE2) are generated at different timings from each other. Thus, the supply current amounts to the temperature sensors 1110 (drive current amounts of the temperature sensors 1110) are substantially equal to each other between the first sensor enable signal (SE1) and the second sensor enable signal (SE2).

According to the present embodiment, the drive current of the temperature sensors 1110 can be reduced incidentally to/alternatively to the drive current generated when the heating resistors 305 are driven as the print elements. Thus, according to the present embodiment, it is possible to appropriately prevent the fluctuations in power supply voltage and the degradation in printing accuracy associated with the fluctuations.

Fifth Embodiment

Figure 12:
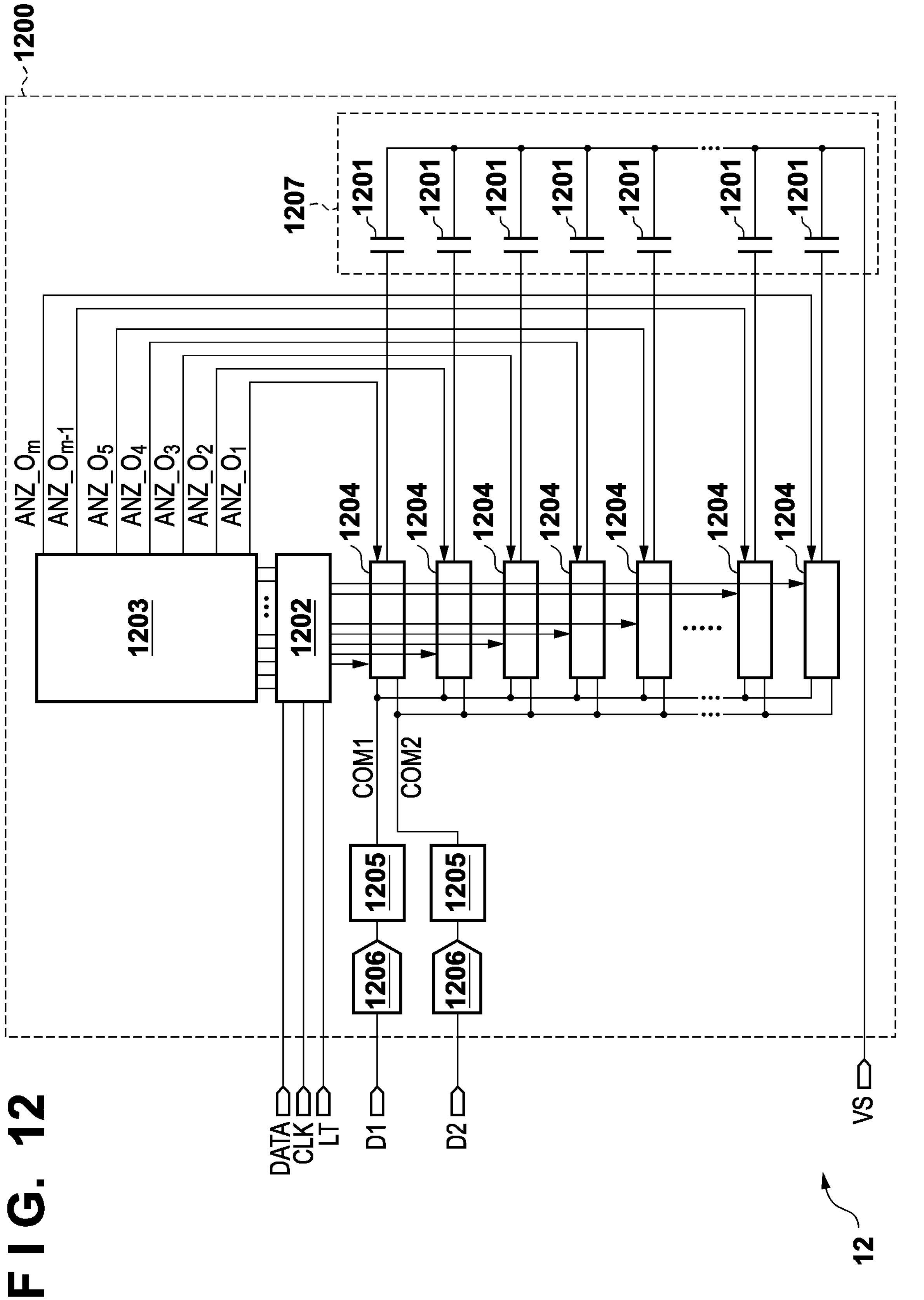
FIG. 12 is a diagram illustrating an example of a circuit configuration of a print head.

FIG. 12 illustrates an example of a circuit configuration of a print head 12 according to a fifth embodiment. In the present embodiment, a capacitive load type piezoelectric element 1201 is used as the print element.

In the present embodiment, the print head 12 includes a plurality of piezoelectric elements 1201 described above, and a driving circuit for driving the piezoelectric elements 1201. The driving circuit in the present embodiment includes a shift register and latch circuit 1202, a plurality (here, two) of digital-to-analog conversion circuits 1206, a plurality (here, two) of driving units 1205, a print data analyzing unit 1203, and a plurality of selection circuits 1204.

The shift register and latch circuit 1202 receives the print data (DATA) from the printing apparatus main unit, and holds the received print data.

The digital-to-analog conversion circuits 1206 convert digital data into analog drive signals. The driving units 1205 amplify the analog drive signals converted by the digital-to-analog conversion circuits 1206 and supply the amplified analog drive signals to each piezoelectric element 1201. When the number of print elements (the number of piezoelectric elements 1201) is large, the plurality of driving units 1205 (here, two) are provided because a driving force is required to drive the print elements appropriately.

The print data analyzing unit 1203 analyzes the print data input to the shift register 1202, and outputs the analysis result (ANZ_O).

The selection circuits 1204 select whether or not the drive signals from the driving units 1205 are to be supplied to the piezoelectric elements 1201 based upon the print data stored in the shift register and latch circuit 1202. Additionally, in a case where this drive signal is supplied to the piezoelectric elements 1201, either one of a first drive signal (COM1) or a second drive signal (COM2) is selected based upon the analysis result (ANZ_O) output from the print data analyzing unit 1203, and the selected one is supplied to the piezoelectric elements 1201. Similarly to the print data analyzing unit 308 described above, the print data analyzing unit 1203 analyzes the print data, and controls the selection circuits 1204 so that the number of print elements to be driven by the first drive signal (COM1) and the number of print elements to be driven by the second drive signal (COM2) are equal to each other. The print data analyzing unit 1203 may be represented as a data analyzing unit, a signal analyzing unit, or may be simply represented as an analyzing unit, similarly to the print data analyzing unit 308.

According to the operation described above, output loads of the plurality of driving units 1205 are substantially equal to each other, and it is possible to allow the first drive signal (COM1) and the second drive signal (COM2) which are output signals of the driving units 1205 to have substantially the same waveform (to suppress waveform deformation). In addition, since the numbers of print elements to be driven by the driving units 1205 are substantially not biased to any one of COM1 and COM2, it is possible to reduce the peak value of the current generated during charging and discharging of the capacity loads, which makes it possible to suppress unnecessary heat generation in the driving units 1205.

According to the present embodiment described above, the output loads of the plurality of driving units 1205 are made uniform, and the waveforms of the drive signals are substantially the same, and unnecessary heat generation in the driving units 1205 can be suppressed. Thus, according to the present embodiment, it is possible to appropriately prevent the fluctuations in power supply voltage and the degradation in printing accuracy associated with the fluctuations.

Others

In the above description, the configurations associated with the printing apparatus are exemplified, but the printing method is not limited to the above-described aspect. In addition, the printing apparatus may be a single function printer having only a printing function, or may be a multi-function printer having a plurality of functions, such as a printing function, a FAX function, and a scanner function. Additionally, for example, a manufacturing apparatus for manufacturing color filters, electronic devices, optical devices, microstructures, or the like by a predetermined printing method may be applicable.

Also, the term "print" in this specification is to be broadly interpreted. Accordingly, an aspect of the term "print" is not limited by whether or not the object to be formed on the printing medium is meaningful information such as characters, and graphics, and whether or not the object is visualized so that a human can visually perceive it.

Additionally, the term "printing medium" is to be broadly interpreted, similarly to the term "print" described above. Accordingly, the concept of the term "printing medium" may include any member that can receive ink, such as cloth, plastic film, metal plates, glass, ceramics, resin, wood, and leather, in addition to paper to be commonly used.

Furthermore, the term "ink" is to be broadly interpreted, similarly to the term "print" described above. Accordingly, the concept of the term "ink" may include, in addition to liquid that forms images, designs, patterns, and the like by being applied to the printing medium, liquid that may be incidentally used for processing of the printing medium, processing of the ink (e.g., coagulation or insolubilization of the colorant in the ink applied to the printing medium), and the like.

Furthermore, in the above description, for ease of understanding, each element is represented by using a name related to its functional aspect, but each element is not limited to an element having the content described in the embodiments as a main function, and may also be an element auxiliary having the content. For example, printing by the printing apparatus may also be regarded as a part of two or more functions of the printing apparatus, and from this aspect, the print element may be expressed as a functional element, and the print data may also be expressed as functional data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-011041, filed on Jan. 27, 2020, which is hereby incorporated by reference herein in its entirety.

What is claimed is:

1. A print element substrate comprising:

a plurality of functional elements;

a heat enable generation circuit configured to generate a first signal and a second signal individually;

a plurality of driving elements configured to drive the plurality of functional elements based upon one of the first signal and the second signal;

a shift register configured to store functional data indicating whether or not to drive the functional element;

a data analyzing unit configured to analyze the functional data input into the shift register; and a drive signal selection unit configured to select one of the first signal and the second signal in response to an analysis result from the data analyzing unit, and to supply the selected signal to the driving element, wherein the first signal is supplied to one of two adjacent functional elements which are to be driven among the plurality of functional elements, and the second signal is supplied to the other of the two adjacent functional elements, such that the number of the functional elements to be driven by the first signal and the number of the functional elements to be driven by the second signal become equal.

2. The print element substrate according to claim 1, wherein the data analyzing unit is a counter configured to count the number of times that the functional data having a predetermined logical level is input to the shift register, and outputs the number of times of the count as the analysis result.

3. The print element substrate according to claim 2, wherein the data analyzing unit is a 1-bit counter, and outputs a 1-bit analysis result as the analysis result based upon whether the number of times that the functional data having the predetermined logic level is input to the shift register is even or odd.

4. The print element substrate according to claim 2, wherein the data analyzing unit is a multi-bit counter, and outputs a multi-bit analysis result as the analysis result based upon the number of times that the functional data having the predetermined logical level is input to the shift register.

5. The print element substrate according to claim 1, wherein the functional element is a print element, the functional data is print data, and the data analyzing unit analyzes the print data.

6. The print element substrate according to claim 5, wherein each of the first signal and the second signal is an enable signal configured to determine an electricity conduction period of time of the print element.

7. The print element substrate according to claim 5, wherein the plurality of print elements are driven by a time-division driving method, and each of the first signal and the second signal is a block selection signal.

8. The print element substrate according to claim 1, wherein the functional element is a sub-heater, the functional data is sub-heat data, and the data analyzing unit analyzes the sub-heat data.

9. The print element substrate according to claim 8, wherein each of the first signal and the second signal is an enable signal configured to determine an electricity conduction period of time the sub-heater.

10. The print element substrate according to claim 1, wherein the functional element is a temperature detecting sensor, the functional data is sensor selection data configured to select the temperature detecting sensor, and the data analyzing unit analyzes the sensor selection data.

11. The print element substrate according to claim 10, wherein each of the first signal and the second signal is an enable signal configured to determine an electricity conduction period of time of the temperature detecting sensor.

12. A print head comprising:

a plurality of print elements;

a heat enable generation circuit configured to generate a first signal and a second signal individually;

a plurality of driving units configured to drive the plurality of print elements based on one of the first signal and the second signal;

a shift register configured to store print data;

a data analyzing unit configured to analyze the print data input to the shift register; and a drive signal selection unit configured to select one of the first signal and the second signal in response to an analysis result from the data analyzing unit, and to supply the selected signal to the driving element, wherein the first signal is supplied to one of two adjacent functional elements which are to be driven among the plurality of functional elements, and the second signal is supplied to the other of the two adjacent functional elements, such that the number of the functional elements to be driven by the first signal and the number of the functional elements to be driven by the second signal become equal.

13. A printing apparatus comprising:

a plurality of print elements;

a heat enable generation circuit configured to generate a first signal and a second signal individually;

a plurality of driving units configured to drive the plurality of print elements based on one of the first signal and the second signal;

a shift register configured to store print data;

a data analyzing unit configured to analyze the print data input to the shift register; and a drive signal selection unit configured to select one of the first signal and the second signal in response to an analysis result from the data analyzing unit, and to supply the selected signal to the driving element, wherein the first signal is supplied to one of two adjacent functional elements which are to be driven among the plurality of functional elements, and the second signal is supplied to the other of the two adjacent functional elements, such that the number of the functional elements to be driven by the first signal and the number of the functional elements to be driven by the second signal become equal.

* * * * *